United States Patent

Gocho et al.

[11] 4,048,849
[45] Sept. 20, 1977

[54] METHOD AND APPARATUS FOR MEASURING SURFACE FLATNESS OF MATERIAL

[75] Inventors: Makio Gocho; Masanori Ota; Tatsuo Kuraishi, all of Fukuyama, Japan

[73] Assignee: Nippon Kokan Kabushiki Kaisha, Tokyo, Japan

[21] Appl. No.: 592,817

[22] Filed: July 3, 1975

[30] Foreign Application Priority Data

July 22, 1974    Japan ................................. 49-83309

[51] Int. Cl.$^2$ ............................................. G01B 7/28
[52] U.S. Cl. ..................................................... 73/105
[58] Field of Search ......... 73/105; 33/174 P, 174 PA; 235/157.3; 324/34 D, 34 L

[56] References Cited

U.S. PATENT DOCUMENTS

| | | | |
|---|---|---|---|
| 3,056,209 | 10/1962 | Oliver | 73/105 |
| 3,087,329 | 4/1963 | von Grodek et al. | 73/105 |
| 3,377,828 | 4/1968 | Harmon | 73/105 |
| 3,470,739 | 10/1969 | Takafuji et al. | 73/105 |
| 3,573,444 | 4/1971 | Kawabata | 73/105 |

*Primary Examiner*—Richard C. Queisser
*Assistant Examiner*—Stephen A. Kreitman
*Attorney, Agent, or Firm*—Flynn and Frishauf

[57] ABSTRACT

Method and apparatus wherein a set of three non-contact gap detectors are arranged at predetermined regular intervals parallel to and in the direction of measurement of the surface flatness of a material, and the gap between the material and each detector is measured and computed continuously to continuously measure and indicate the surface flatness of the material without being affected by an overall curve of the material and also to measure the period of the occurrences of the defect in the flatness of the material.

7 Claims, 8 Drawing Figures

$y_{(x)} = A \sin \omega x - B$ $a = 1 - \cos \pi \frac{L}{\lambda_1}$

METHOD AND APPARATUS FOR MEASURING SURFACE FLATNESS OF MATERIAL

BACKGROUND OF THE INVENTION

In the manufacture of steel products such as steel plates, steel shapes and rails, some periodic surface irregularities occur in the material and sometimes such irregularities are so great that the material is not according to the specifications. Such unsatisfactory flatness must be accurately measured to adjust the settings of the rolling mills, etc. on the manufacturing line. Particularly, where the period of irregularities is relatively short, there is a great necessity for straightening the irregularities and the irregularities must be measured with a high degree of accuracy.

The flatness measuring methods which have heretofore been used for this purpose include for example a method that employs an electrical level and another method that employs a differential transformer displacement measuring device so that the flatness of a material to be measured which is placed on a surface plate is measured in terms of variations in the height of the material. However, these conventional methods have their own disadvantages as will be described hereunder.

In other words, the measuring method employing an electrical level is disadvantageous in that since the flatness of a material to be measured is obtained by measuring the degree of levelness of the measured surface at regular intervals of about 200 mm by applying the electrical level to the surface of the material, not only is the measuring operation complicated and time consuming, but also the measurement is affected by the conditions in which the material is placed or the degree of levelness of its holding stand and the greater curvature of the material on the whole (hereinafter referred to as an overall curve), thus making it impossible to make an accurate measurement of the actual irregularities in the surface of the material. The measuring method of measuring the flatness of a material by a differential transformer displacement measuring device in terms of variations in the height of the measured surface is also disadvantageous in that since the measurement is carried out by placing a material to be measured on a surface plate having a very high degree of flatness and moving the displacement measuring device in a direction parallel to the surface of the surface plate, while it is necessary to provide a surface plate device having an excellent flatness, it is difficult to ensure the required accuracy of a surface plate or obtain a suitable surface plate that meets a long measuring length, thus giving rise to a difficulty in providing the necessary equipment. Moreover, the fact that the location of measurement is limited to the location of the surface plate gives rises to difficult problems in operation such as the transfer of material to be mmeasured. There is also a deficiency in the efficiency of the method in that even if the material is measured by placing it on a surface plate the measurement is affected by the overall curve of the material.

SUMMARY OF THE INVENTION

With a view to overcoming the foregoing difficulty, it is an object of the present invention to provide a measuring method and apparatus which are capable of measuring the actual surface flatness of a material with a high degree of accuracy and without being affected by the degree of levelness of a holding stand or surface plate, the overall curvature of the material, or the like.

In accordance with the present invention, there is thus provided a surface flatness measuring method and apparatus for measuring the surface flatness of a metal product with at least one non-contact detector arranged opposite to the metal product to measure the gap therebetween, wherein the detector is mounted at least at the central one of a set of three gap detectors prearranged at predetermined regular intervals on a linear reference axis in the direction of measurement, and either of the detecting points and the material is moved in the direction of measurement relative to the other without changing the position of the detecting points relative to each other, whereby the flatness of the material as well as the amplitude and period of the surface irregularities are continuously measured by continuously computing the difference between the arithmetic mean of the gaps detected at the two detecting points arranged on both sides of and spaced away from the central detecting point by the predetermined equal distance and the gap detected by the detector at the central detecting point.

DESCRIPTION OF THE PREFERRED EMBODIMENTS

Figure 1:
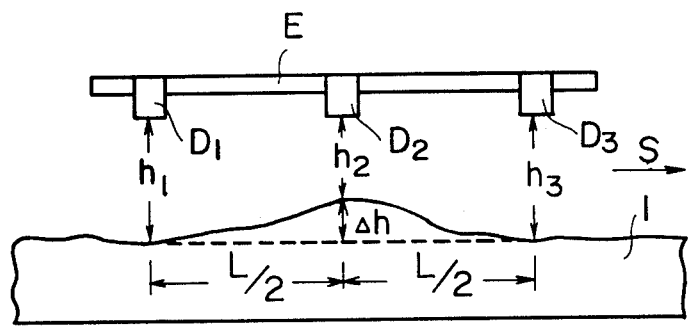
FIG. 1 is a schematic diagram showing an exemplary position of a material to be measured relative to measuring means according to a method and apparatus of the invention.

Referring first to the schematic diagram of FIG. 1 which is useful in explaining the principle of the present invention, a supporting member E having an excellent straightness (flatness) for providing a linear reference axis is arranged in the direction of measurement S above the surface of a material 1 to be measured, and detectors $D_1$, $D_2$ and $D_3$ are mounted at three equispaced points on the supporting member E.

Either the supporting member E carrying the detectors $D_1$, $D_2$ and $D_3$ thereon or the material 1 is moved along the direction of measurement S relative to the other and the outputs of the detectors are processed to measure the flatness of the measured surface.

In other words, assuming that $h_1$, $h_2$ and $h_3$ respectively represent the detected value of the detectors $D_1$, $D_2$ and $D_3$, then the resulting surface waviness $\Delta h$ is given as $$\Delta h = \frac{h_1 + h_3}{2} - h_2$$

Therefore, by presetting a total distance L between the outermost detectors at various suitable values, surface irregularities of various periods may be measured quantitatively.

Figure 2:
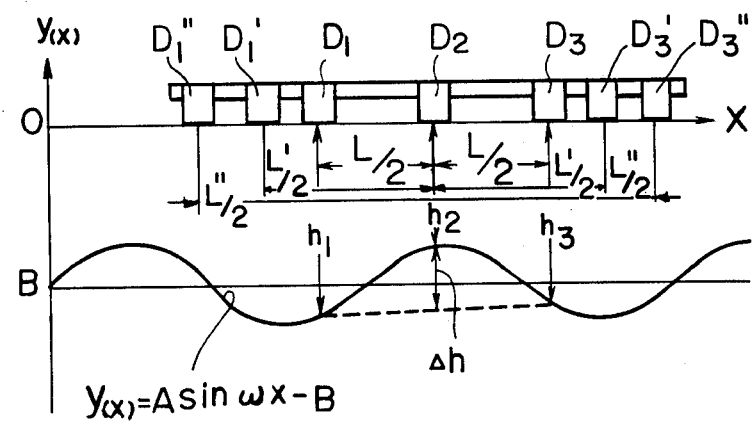
FIG. 2 is a schematic view similar to FIG. 1 in which assuming that the irregularities in the surface of a material are representable by a general expression, the pattern of the surface irregularities is graphically represented as a curve corresponding to the expression.

Assuming that as shown graphically in FIG. 2, the periodic waviness in the surface of a material is represented as $Y(x) = A \sin \omega X - B$ (where $\omega = 2\pi/\lambda_1$ is the period of the waviness) and L/2 represents the distance between the detectors, then the detected values of the detectors $D_1$, $D_2$ and $D_3$ are given as follows $h_1 = B - A \sin \omega x$
$h_2 = B - A \sin \omega(x + L/2)$
$h_3 = B - A \sin \omega(x + L)$ where x is the distance of relative motion in the direction of progression of measurement between the material and the detecting points. Therefore, the surface waviness $\Delta h$ is given as $$\Delta h = (h_1 + h_3)/2 - h_2$$
$$= A(1 - \cos \frac{\omega L}{2}) \cdot \sin \omega(x + \frac{L}{2})$$
$$= A(1 - \cos \pi \frac{L}{\lambda_1}) \cdot \sin \frac{2\pi}{\lambda_1}(x + \frac{L}{2})$$

Namely, in accordance with the measuring method of this invention the measured value $\Delta h$ is obtained in terms of a waveform whose amplitude is $A(1 - \cos \rho(L/\lambda_1))$ and period is $\lambda_1$, and consequently the measured value $\Delta h$ has an amplitude value proportional to the surface irregularities of a material and the same period as the surface irregularities.

The measured amplitude value may be adjusted as desired depending on the distance L between the outermost detectors. Consequently, if $a$ represents an amplitude ratio and $a$ = the amplitude of $\Delta h$/the amplitude of irregularities in measured surface, then the amplitude ratio is given as $$a = A(1 - \cos \pi \frac{L}{\lambda_1})/A = (1 - \cos \pi \frac{L}{\lambda_1})$$

Figure 3:
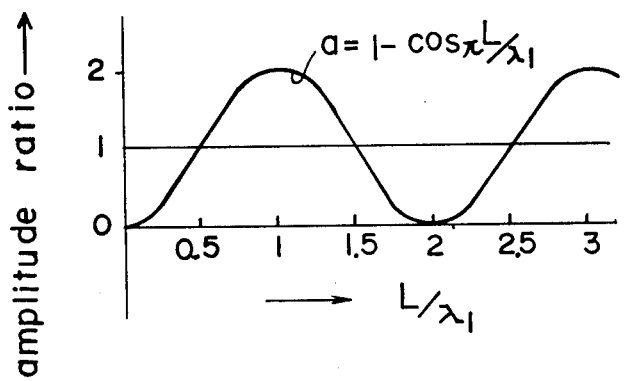
FIG. 3 is a diagram showing the effect of the distance between detectors on the ratio between the measured amplitude values representing the detected gaps and the amplitude values of the actual irregularities.

Therefore, the amplitude ratio may be made 1 depending on the value of $L/\lambda_1$ as shown in FIG. 3. In practice, since the period $\lambda_1$ may be determined from the measured value, it is possible to adjust the measured amplitude value to the actual amplitude value in accordance with the relationship between the period $\lambda_1$ and a preset value of L.

On the other hand, where there is an overall curve in a material to be measured in addition to such a periodic irregular waviness (hereinafter referred to as a wavy curve), the effect of this overall curve on the measured value $\Delta h$ according to the invention will be as follows. Assuming that the wavy curve is $A_1 \sin(2/\lambda_1)x$ and the overall curve is $A_2 \sin(2\pi/\lambda_2)(x + l)$, the measured value $\Delta h$ is given as the sum of a wavy curve component $\Delta h_1$ and an overall curve component $\Delta h_2$, as follows:

$$\Delta h = \Delta h_1 + \Delta h_2$$

$$= A_1(1 - \cos \pi \frac{L}{\lambda_1}) \cdot \sin \frac{2\pi}{\lambda_1}(x + \frac{L}{2})$$
$$+ A_2(1 - \cos \pi \frac{L}{\lambda_2}) \cdot \sin \frac{2\pi}{\lambda_2}(x + \frac{L}{2} + l)$$

Figure 4:
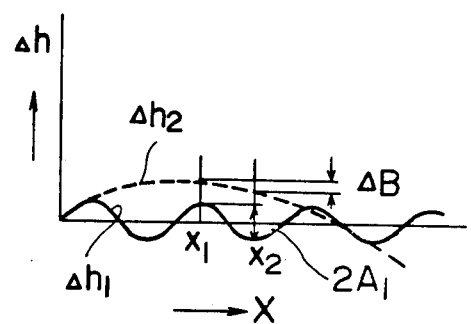
FIG. 4 is a diagram showing graphically the measured values $\Delta h_2$ of an overall curve and the measured values $\Delta h_1$ of a wavy curve constituting the object of the measurement according to the invention.
Figure 5:
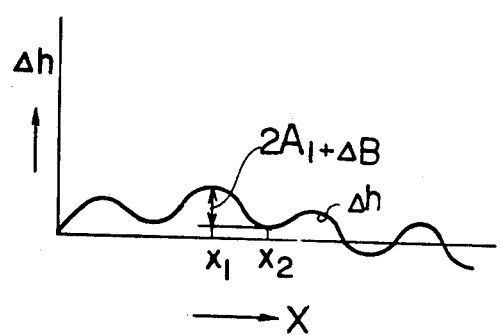
FIG. 5 is a diagram showing graphically the composite waveform of $\Delta_1$ and $\Delta h_2$.

FIG. 4 is a diagram showing graphically the above-mentioned components $\Delta h_1$ and $\Delta h_2$, and FIG. 5 is a diagram showing in graphic form the composite waveform $\Delta h = \Delta h_1 + \Delta h_2$. As will be seen from FIGS. 4 and 5, the amplitude value (maximum) of a single wavelength of the composite waveform shown in FIG. 5 (i.e., the wavelength between $x_1 = (n + \frac{1}{4})\lambda_1$ and $x_2 = (n + \frac{3}{4})\lambda_1$) is the sum of a wavy curve component $2A_1$ and on overall curve component $\Delta B$ and this $\Delta B$ corresponds to an error due to the overall curve. The value of $\Delta B$ is obtained as follows:

$$\Delta B = \Delta h_2(x_1) - \Delta h_2(x_2)$$
$$= A_2(1 - \cos \pi \frac{L}{\lambda_2}) \times 2 \cos \frac{2\pi}{\lambda_2}\left[(n + \frac{1}{4})\lambda_1 + l\right]$$
$$\times \sin \frac{\pi}{2} \frac{\lambda_1}{\lambda_2}$$

Consequently, the ratio of the component $\Delta B$ to the wavy curve amplitude $2A_1$ is given as $$\Delta B/2A_1 = A_2(1 - \cos \pi \frac{L}{\lambda_2}) \cdot 2 \cos \frac{2\pi}{\lambda_2}\left[(n + \frac{1}{4})\lambda_1 + l\right] \cdot \sin \frac{\pi}{2} \frac{\lambda_1}{\lambda_2}/2A_1$$

If, it is assumed that $L/\lambda_1 = \frac{1}{2}$, then $$\Delta B/2A_1 \leq (1 - \cos \frac{\pi}{2} \frac{\lambda_1}{\lambda_2}) \cdot \sin \frac{\pi}{2} \frac{\lambda_1}{\lambda_2} \cdot \frac{A_2}{A_1}$$

Also assuming that the period $\lambda_2$ of the overall curve is 20 times the period $\lambda_1$ of the wavy curve, then $$\Delta B/2A_1 \leq 210 \times 10^{-4} \frac{A_2}{A_1}$$

Consequently, in the measuring method according to the invention the effect of an overall curve having a period which is normally far greater than that of a wavy curve is such that it can be practically neglected and it is possible to accurately measure only the wavy curve.

With the measuring method of the invention described above, it is possible to measure the flatness of a material in a truly non-contacting manner by using for example the detector at each of the three detecting points to measure the gap between the measured surface and the respective detecting points, whereas if the detector is used only at the central detecting point and a roller which is free from vertical vibration and eccentricity is mounted on the forward end of a leg member provided at each of the detecting points on both sides of the central detecting point, the values of the abovementioned $h_1$ and $h_3$ can be fixed and thus the flatness of a material can be measured by means of the single detector.

Further, where a set of three detecting points are employed, the resulting distance L between the outermost detectors cannot be changed in the course of measurements and therefore if the use of a different distance L is desired, the measuring operation must be carried out anew. However, if for example a plurality of detectors greater than three are preliminarily mounted on a supporting member, as shown in FIGS. 2 and 6, the detectors may be selected in different ways to ensure simultaneous measurements with different distances L between and detectors.

Figure 6:
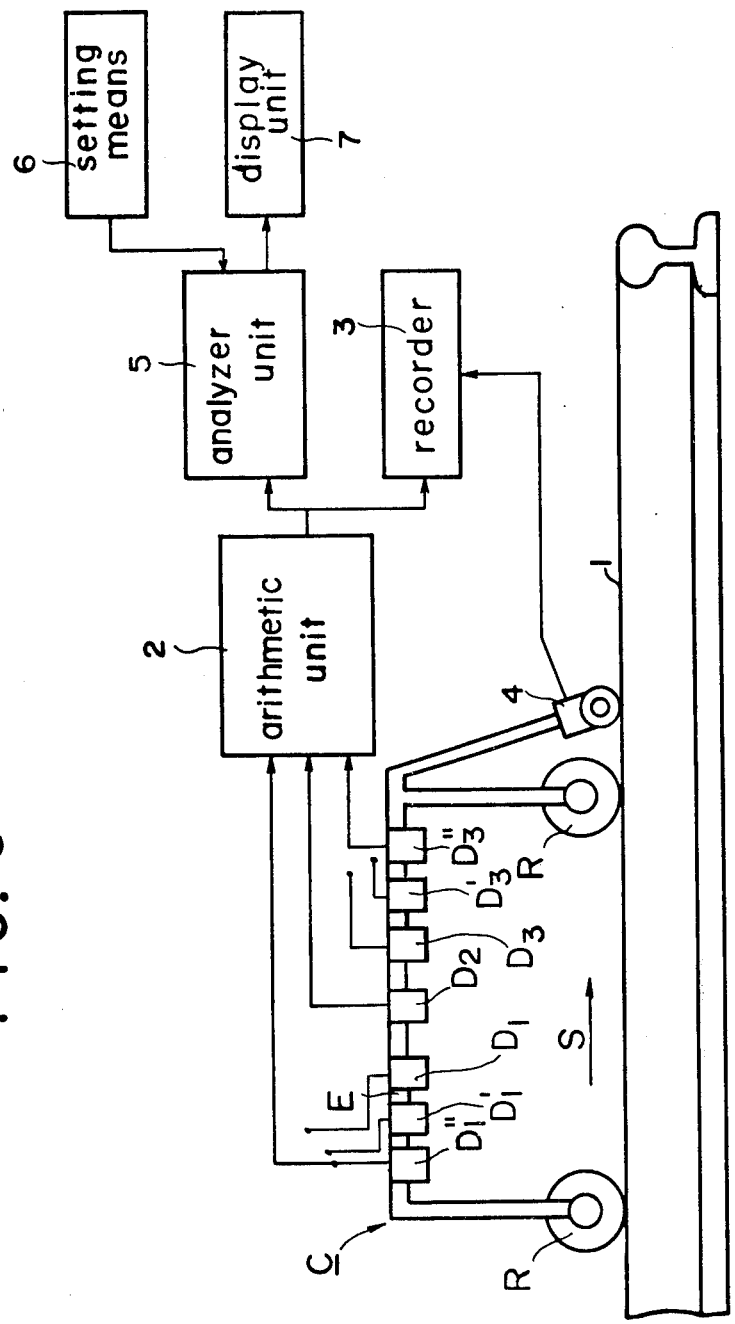
FIG. 6 is a schematic block diagram showing the construction of a measuring apparatus according to an embodiment of the invention.
Figure 7A:
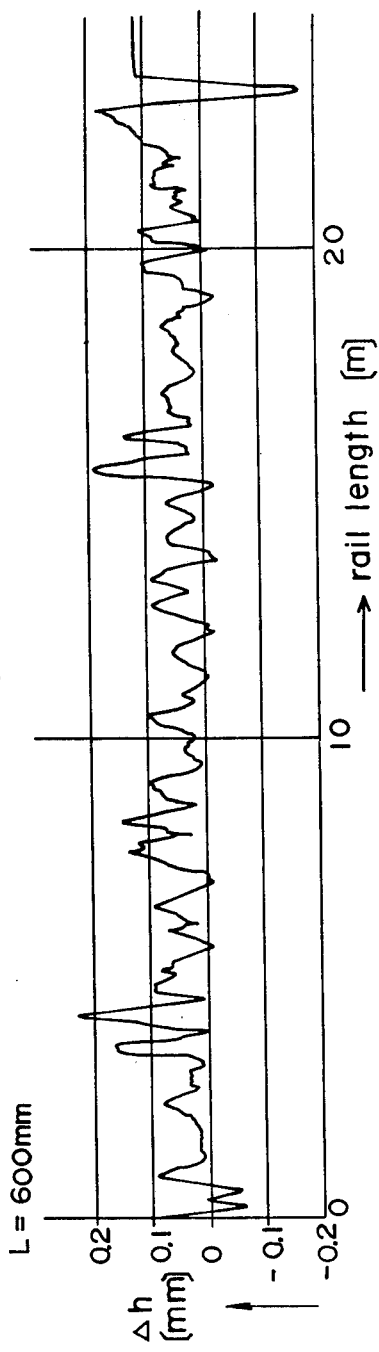
FIGS. 7(a) and 7(b) are diagrams showing the results of the actual measurements.
Figure 7B:
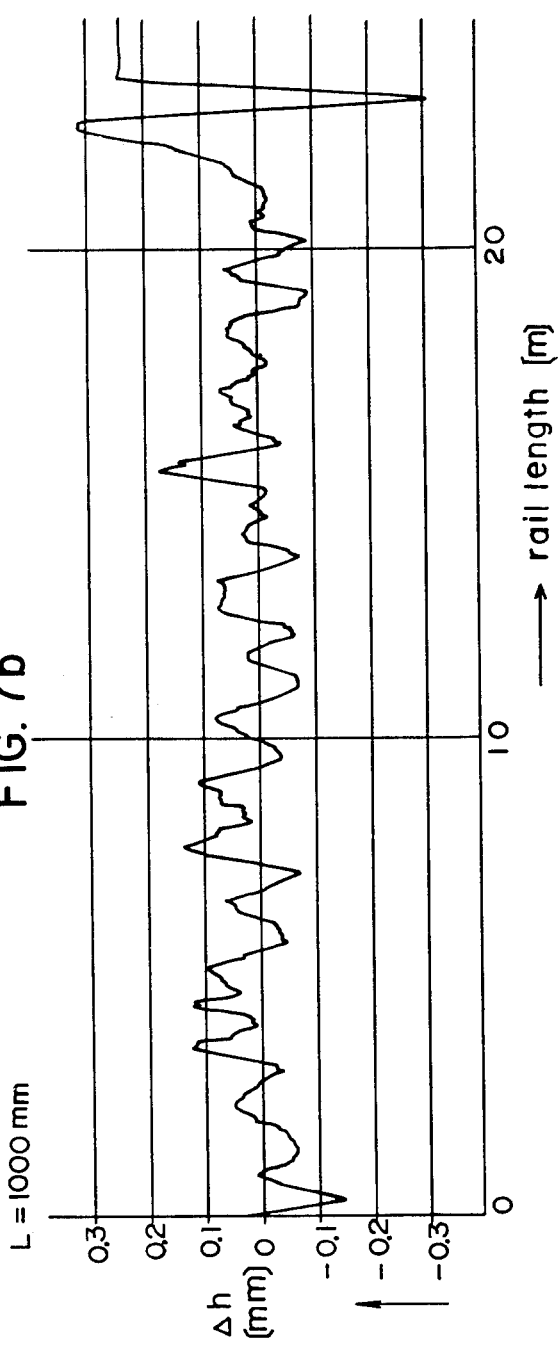

FIGS. 6 shows the construction of a measuring apparatus according to an embodiment of the invention which is used in measuring the wavy deformation of rails and FIGS. 7(a) and 7(b) show the results of measurements by the apparatus.

In FIG. 6, numeral 1 designates a rail or a material to be measured, C a measuring carriage comprising a supporting member E, detectors $D_1$, $D'_1$, $D''_1$, $D_3$, $D'_3$ and $D''_3$ mounted on the supporting member E, a pair of driving rollers R provided at the ends of the supporting member E and a roller type pulse oscillator 4 for adjusting the chart feed of a recorder 3 to the measuring length. Numeral 2 designates an arithmetic unit for computing $\Delta h = (h_1 + h_3)/2 - h_2$ from detected values $h_1$, $h_2$ and $h_3$ measured respectively by the detectors $D_1$, $D_2$ and $D_3$, and 3 a recorder for recording the value of $\Delta h$.

An analyzer unit 5 which receives a branched output of the arithmetic unit 2 computes the amplitude and period of the actual irregularities in the rail 1 or the material to be measured from a detector distance L preset by setting means 6 and the output $\Delta h$ of the arithmetic unit 2, and the output of the analyzer unit 2 is indicated on a display unit 7.

FIGS. 7(a) and (b) show the results of measurements made by moving the measuring carriage C over the rails in the direction of measurement S.

FIG. 7(a) shows the values of $\Delta h$ measured in the lengthwise direction of the rail with $L = 600$ mm, and FIG. 7(b) shows the results obtained by similar measurements with $L = 1,000$ mm.

It will thus be seen from the foregoing description that in accordance with the present invention any irregularities in the surface of a material to be measured which are periodic and having wavelengths in a specific range can be measured without practically being affected by the conditions in which the material is placed and the overall curve of the material itself, and moreover there is no limitation to the location of measurement—that is, even a rail which is for example laid in the ground or the like can be measured. The measuring operation is simple and a measuring apparatus of this invention is compact and has a wide range of applications—that is, it is capable of measuring not only the surface flatness of thick steel plates, shaped steels, etc., but also the built-up shape of strip coils, etc. Thus, the present invention has many industrial uses.

What is claimed is:

1. In an apparatus for measuring the surface flatness of a metal product with a plurality of detectors arranged opposite to said product to be measured to measure in non-contacting manner the gap between said detectors and the surface of said product, the combination comprising:

a reference plane arranged opposite to the surface of said product;

a first detector means including at least three detectors respectively arranged at each of a first set of at least three detecting points which are arranged at a predetermined substantially equal distance from each other on said reference plane along a direction of measurement, and a second detector means including at least three detectors respectively arranged at each of a second set of at least three detecting points using in common the detector of said first detector means which is located at said central detecting point of said first set of detecting points;

arithmetic means for receiving and operating on measured signal values from only one of said first and second detector means respectively associated with said first and second sets of detecting points;

means for selectively coupling only one of said first and second detector means to said arithmetic means at a time;

recording means coupled to said arithmetic means;

analyzing means coupled to said arithmetic means;

setting means coupled to said analyzing means for presetting the value of a distance L between the detecting points on both sides of the central detecting point in said selected set of three detecting points; and means coupled to said analyzing means for measuring the distance of relative motion between said product and only said selected set of detecting points which are defined by said selected detector means.

2. Apparatus according to claim 1 further comprising a measuring carriage including:

a pair of wheels rotatable on said product and arranged in a direction of progression of measurement;

detector supporting means for supporting said detectors; and a roller type pulse oscillator coupled to said recording means.

3. Apparatus according to claim 1 comprising rollers for suspending said reference plane a predetermined distance away from said surface of said product, said rollers being adapted to roll on said surface of said product.

4. A method of measuring the surface flatness of metal products comprising:

providing a plurality of detectors arranged opposite to a product to be measured to measure in a non-contacting manner the gap between said detectors and a surface of said product, said detectors each being mounted at respective gap detecting points;

selecting either (i) a first set of at least three gap detecting points arranged along a direction of measurement at a predetermined substantially equal distance from each other on a linear reference axis, one of said detecting points being centrally located with respect to the others or (ii) a second set of at least three detecting points, the central detecting point of said first set being used in common with said detecting points of said second set as the central detecting point of said second set, said detecting points of said second set being arranged along said direction of measurement at a predetermined substantially equal distance from each other which is different from that of said first set of detecting points;

mounting at least one of said detectors at said central detecting point of said first set of gap detecting points;

moving one of said product and said detecting points relative to the other along said direction of measurement without changing the position of said detecting points relative to one another;

measuring the distance of said relative motion; and continuously measuring the flatness of said product by continuously performing a computational operation of the difference between an arithmetic mean of gaps detected at said detecting points of one of said sets arranged on both sides of and spaced away by said predetermined distance from said central detecting point and a gap detected at said central detecting point, whereby only one of said sets of at least three detectors is selected to measure the gap between said selected set of detectors and the surface of said product.

5. A method according to claim 4 comprising determining the period of the occurrences of a defect impairing the flatness of said product by said computational operation.

6. A method according to claim 4 wherein said second set of detecting points are arranged on said linear reference axis.

7. A method according to claim 6 comprising mounting said linear reference axis on a pair of rollers which are adapted to roll on said product and which are adapted to maintain said linear reference axis a predetermined distance from said product.

* * * * *